Aug. 29, 1933.　　P. C. LOMBARDINI　　1,924,949
WATER CRAFT
Filed April 1, 1931　　5 Sheets-Sheet 1

Inventor
P. C. Lombardini
Watson E. Coleman.
Attorney

Aug. 29, 1933. P. C. LOMBARDINI 1,924,949
WATER CRAFT
Filed April 1, 1931    5 Sheets-Sheet 2

Inventor
P. C. Lombardini
Watson E. Coleman
Attorney

Aug. 29, 1933.     P. C. LOMBARDINI     1,924,949
WATER CRAFT
Filed April 1, 1931     5 Sheets-Sheet 5

Inventor
P. C. Lombardini
Watson E. Coleman
Attorney

Patented Aug. 29, 1933

1,924,949

UNITED STATES PATENT OFFICE 1,924,949

WATER CRAFT

Pietro Clemente Lombardini, London, England

Application April 1, 1931, Serial No. 526,937,
and in Great Britain April 1, 1930

2 Claims. (Cl. 115—20)

This invention relates to water craft and has for its object to provide an improved construction of vessel which shall be capable of attaining very high speeds when propelled on the surface of the water.

In the known forms of water craft the speed attainable is limited by the resistance to motion produced by the friction of the water on the hull of the vessel and various proposals have been made for reducing this resistance. Among these proposals appears one in which a vessel intended for high speeds comprises a buoyant body adapted to float on water and rollers, wheels, drums or the like arranged at the sides of the body to rotate about horizontal axes transverse to the direction of travel of the vessel, these rollers or the like being immersed in the water when the vessel is stationary but being driven at a peripheral velocity at least equal to the linear velocity of the vessel, when the latter is moving, in order to produce an upward thrust which raises the vessel in the water and causes the rotary bodies to roll forward on the water with a diminished immersion.

According to this invention, however, the improved vessel comprises a buoyant body or bodies adapted to float on water, rotary bodies mounted within each of said buoyant bodies on horizontal axes disposed transversely thereof so that their peripheries extend through apertures formed in the bottom of the buoyant body and are normally partially immersed in the water, means for propelling the buoyant body or bodies over the surface of the water and means for rotating the rotary bodies in a direction such that they tend to roll forward on the water, the peripheral velocity of the rotary bodies being at least equal to the linear velocity of the buoyant body or bodies and the means propelling the latter producing at the same time a lifting of the body or bodies in the water, due to the reaction of the latter on the exposed peripheral portions of the rotary bodies, which causes the vessel to travel forward with a diminished immersion.

Any known means may be employed to propel the vessel, such as screw propellers working in the water or in the air, and the engines driving such propellers may be internal combustion engines of any type or other suitable prime movers.

In order that the invention may be clearly understood reference will now be made to the accompanying drawings, wherein:—

Figure 15:
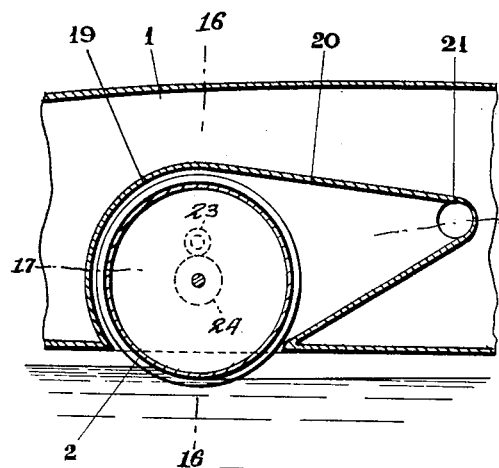
Figure 15 is a fragmentary longitudinal section through the portion of the vessel showing one of the propeller rollers and its housing.
Figure 16:
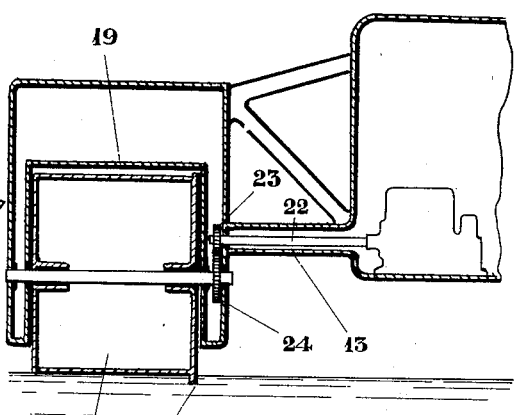
Figure 16 is a section on the line 16—16 of Figure 15.
Figure 17:
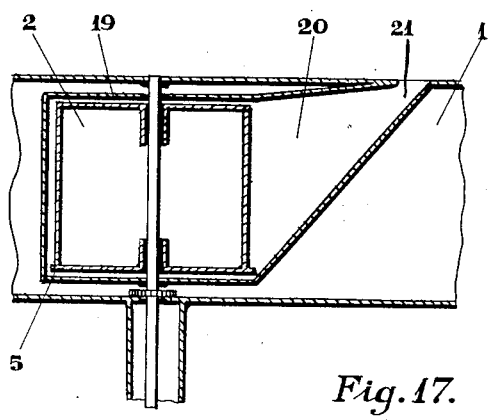
Figure 17 is a section on the line 17—17 of Figure 15.

Referring to the construction shown in Figs. 1 to 3, it will be seen that the vessel comprises a single buoyant body 1, of stream-line form, within which are mounted on horizontal axes disposed transversely of the body two lateral sets of rollers 2 each of which rollers, as shown in Figures 15 to 17 is received over the greater part of its periphery within a recess formed in the underside of the body 1 the remaining portion of its periphery projecting below the bottom of the body 1 into the water, indicated by 3.

Figure 1:
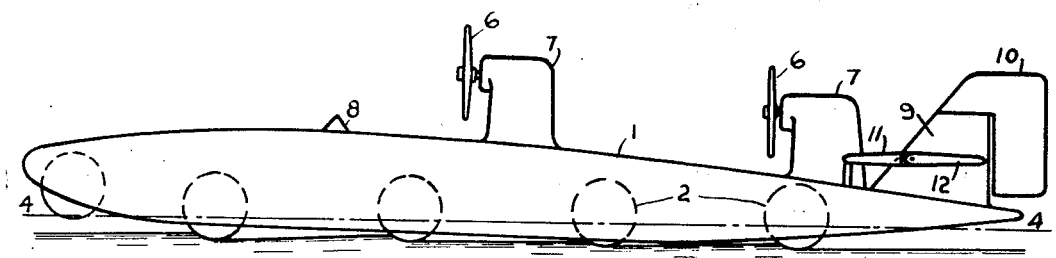
Fig. 1 is a side elevation of a high speed vessel according to this invention.

The normal water-line, i. e. when the vessel is at rest, is indicated by the broken line 4—4 in Fig. 1.

Figure 2:
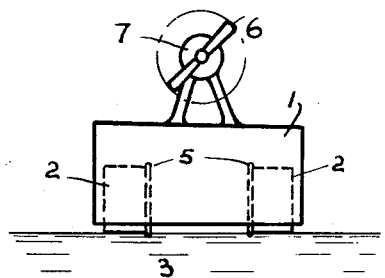
Figs. 2 and 3 are, respectively, front elevational and plan views thereof, the propelling means being omitted from Fig. 3.
Figure 3:
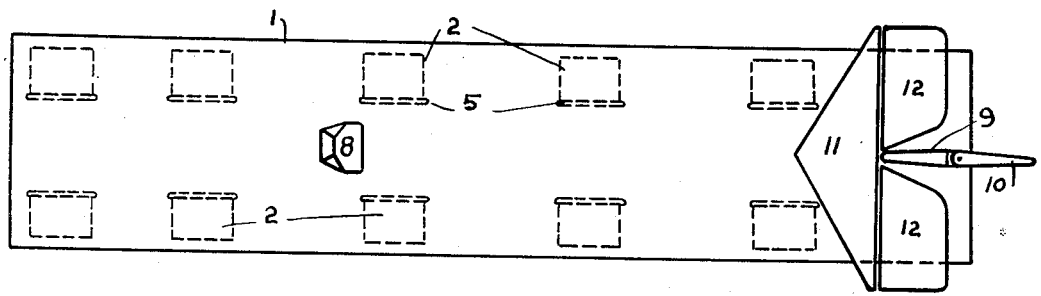
Figure 14:
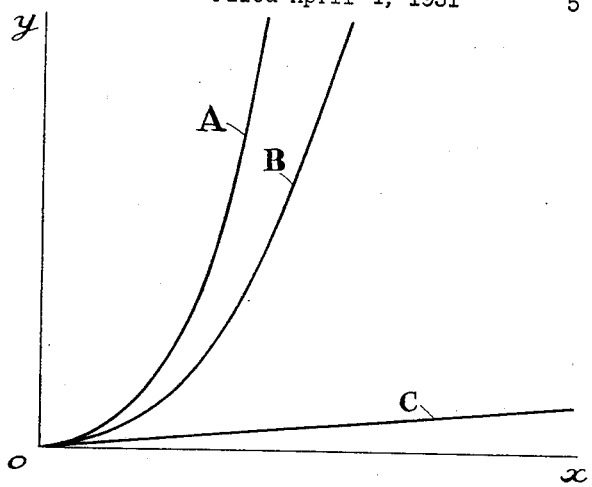
Figure 14 is a curved diagram showing graphically the lifting effects of the three forms of elevating surfaces shown in Figures 10, 11 and 12.

Each of the rollers 2 is formed with a peripheral flange 5 on its inner edge, Figs. 2, 3 and 14, to assist in maintaining the vessel in a straight course when it is travelling over the water and these rollers are adapted to be driven by any suitable means in the directions indicated by the arrows in Fig. 1.

Means are provided for propelling the vessel and comprise air screws or propellers 6 driven by motors 7 mounted on the upper surface of the body 1 at the rear of the cockpit 8 for the accommodation of the pilot.

Stabilizing, steering and similar means are provided at the rear of the body 1, these means comprising a vertical fin 9 carrying a pivotally mounted rudder 10 and a substantially horizontal fin or aerofoil 11 carrying on its rear edge hingedly mounted elevator fins 12.

The fin or aerofoil 11 is adjustable as regards its inclination to the hoizontal in order to vary the angle which the longitudinal axis of the body 1 makes with the surface of the water 3 when in motion, in a manner which will be readily understood.

By means of the elevator fins 12 the vessel may be caused to bank when turning at speed, the rudder 10 determining the radius of the curve which the vessel describes in turning.

In operation, the rollers 2 are rotated at a peripheral velocity at least equal to the linear velocity of the vessel which is propelled by the action of the air screws 6.

Owing to this rotation of the rollers 2 the frictional resistance of the water to the travel of the vessel is greatly reduced and the forward motion of the vessel due to the propelling means causes the reaction of the water on the exposed peripheral portions of the rollers 2 to lift the vessel in the water, whereby the said resistance is still further reduced.

At high speeds of travel of the vessel the latter assumes the position shown in Fig. 1 with respect to the water 3, as the reaction due to the water increases to such an extent that the rollers 2 in effect are travelling on a solid surface.

Figure 4:
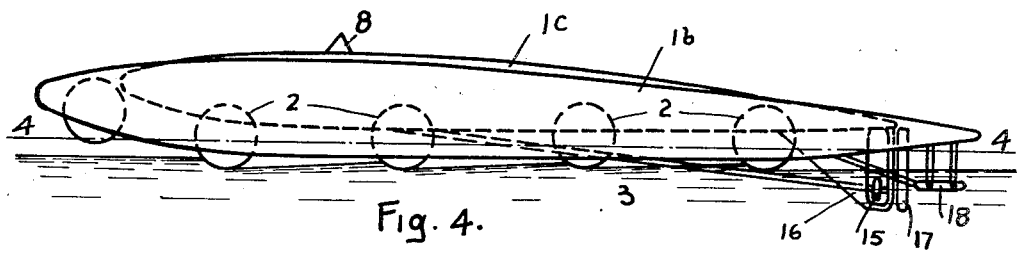
Figure 4 is a side elevation of another construction of high speed vessel in accordance with my invention.
Figure 5:
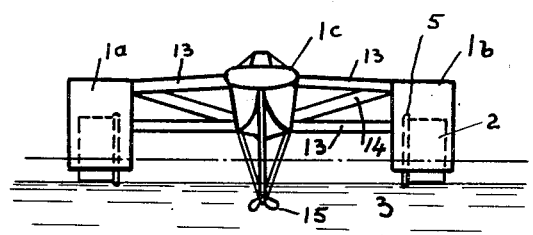
Figure 5 is a front elevation thereof.
Figure 6:
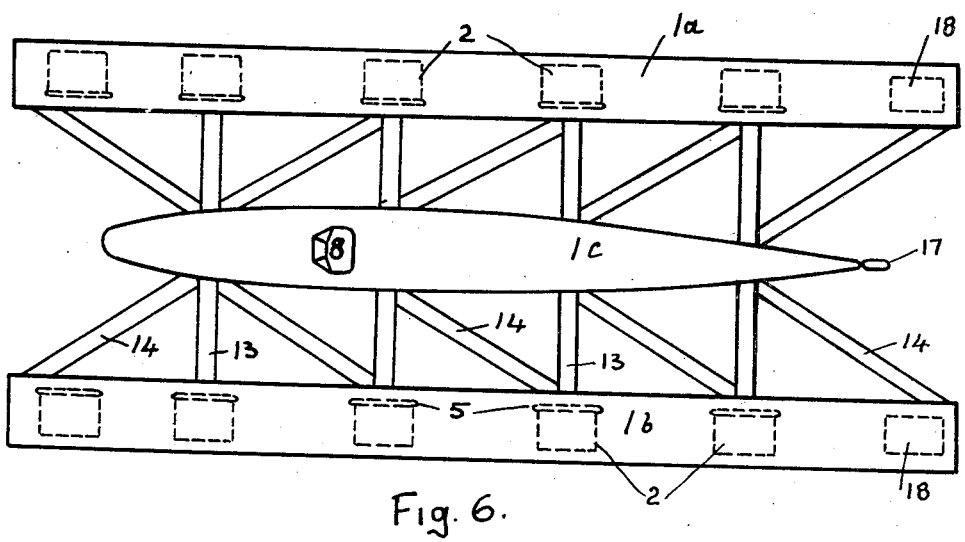
Figure 6 is a plan view thereof.

Referring now to Figs. 4 to 6, the vessel here shown comprises a pair of similar stream-lined buoyant bodies $1^a$ and $1^b$ disposed in spaced parallel relation and each provided with a set of rollers 2 substantially as described in connection with Figs. 1 to 3.

A central body $1^c$ is carried from the buoyant bodies $1^a$, $1^b$, centrally thereof, by struts 13 disposed transversely of the longitudinal centre line of the vessel, further inclined struts 14 being provided to ensure sufficient strength and rigidity to the vessel as a whole.

This central body $1^c$ is provided with the cockpit 8 and carries suitable driving means for rotating a screw propeller 15 working in the water 3 at the rear of the vessel. Suitable means are also provided at the rear end of the body $1^c$, comprising a stabilizing fin 16 carrying a rudder 17, and adjustable elevator planes or fins 18 are disposed in the water 3 beneath each of the rear ends of the bodies $1^a$, $1^b$ to serve the same purpose as the parts 12 described in connection with Figs. 1 to 3.

The means driving the rollers 2 may be disposed in the bodies $1^a$, $1^b$, or these rollers may be driven from motors disposed in the body $1^c$, the transmission shafts being disposed within or parallel to the struts 13.

Suitable gearing may be employed to convey the rotation of the transmission shafts (not shown) to the rollers 2 and the operation of the vessel is substantially the same as that hereinbefore described in connection with Figs. 1 to 3.

Figure 7:
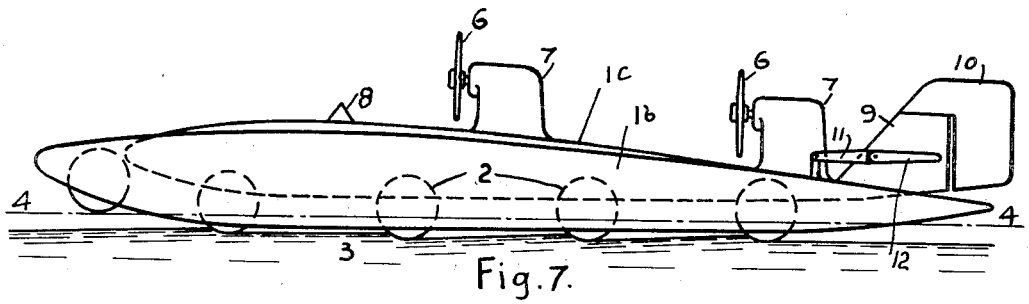
Figures 7, 8 and 9 are respectively a side elevation, a front elevation and a top plan view of another vessel constructed in accordance with my invention.
Figure 8:
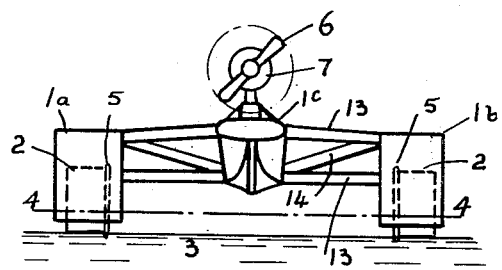
Figure 9:
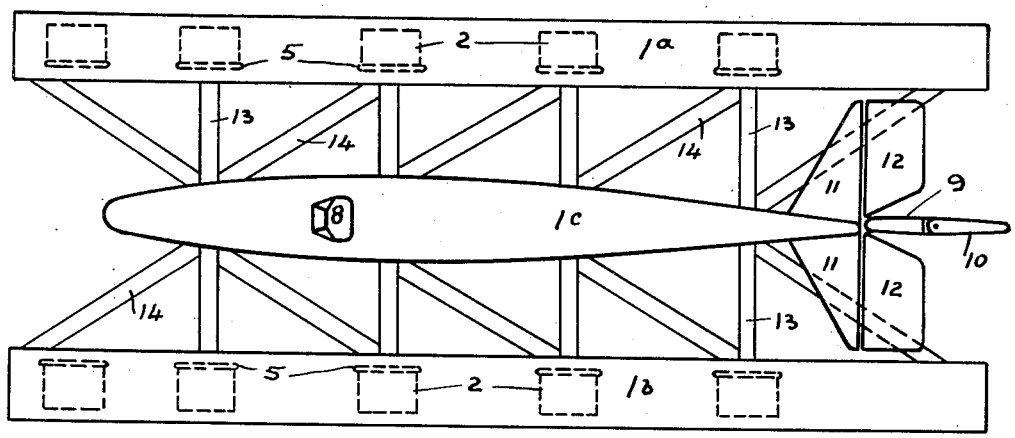

Figs. 7 to 9 show a construction in which certain features of the two constructions already described are combined and no further description thereof is considered necessary, corresponding reference numerals having been applied to the corresponding parts in these figures.

Referring now to the diagrams of Figs. 10 to 14, Fig. 10 illustrates a buoyant body $1^d$ having part cylindrical surfaces $2^a$ projecting downwardly from its under-surface.

If a forward propulsive effort be exerted on this body in the direction of the arrow X there will be produced, due to the reaction of the water on said surface $2^a$, an upward force in the direction of the arrow Y tending to reduce the immersion of the body $1^d$ in the water. The curve A in Fig. 14, where the axis o—x indicates linear velocity of the body and the axis o—y indicates the power required to propel the body, illustrates the relation which exists between the propelling force and the speed of the vessel $1^d$ produced thereby. As will be seen the power required increases much more rapidly than the speed attained as the value of the latter rises, this being due to the frictional resistance offered by the water to the travel of the body $1^d$.

Figure 10:
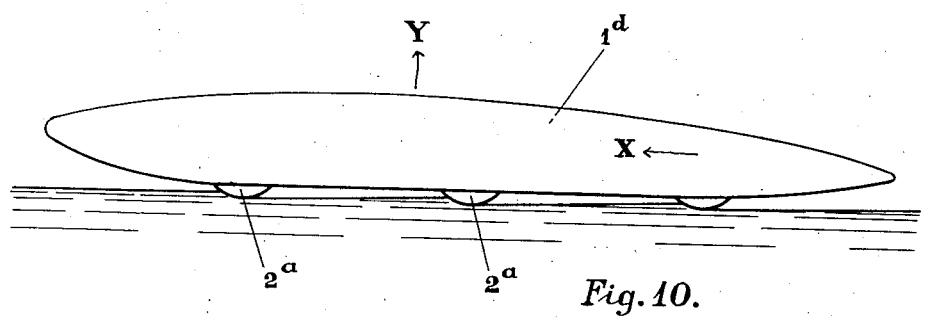
Figures 10, 11 and 12 are diagrammatic side elevations of vessels having various elevating surfaces.
Figure 11:
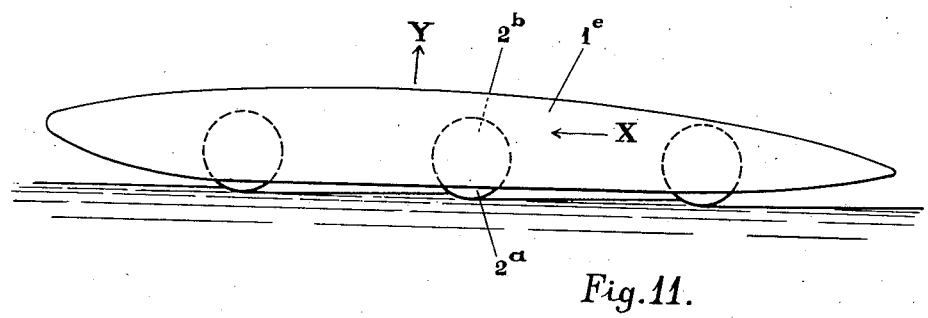

Fig. 11 illustrates a buoyant body $1^e$ of the same dimensions as that shown in Fig. 10 in which the part cylindrical surfaces $2^a$ are provided by portions of freely rotatable rollers $2^b$.

In this case forward movement of the body $1^e$ under the action of the force X again produces an upward force Y but the rollers $2^b$ being free to rotate, are rotated by the impact of the water thereon and the frictional resistance of the water to the travel of the body $1^e$ is therefore reduced. An improved power-speed curve B, Fig. 14, is thus obtainable but the power required for very high speeds is still too large for economical attainment of such speeds.

Figure 12:
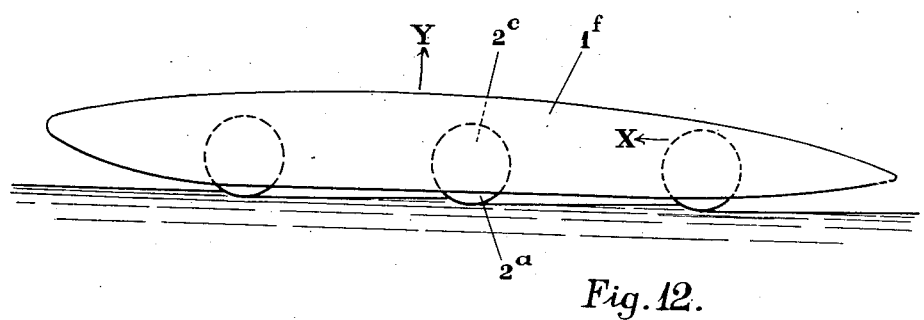

Fig. 12 illustrates diagrammatically a body $1^f$ in which the surfaces $2^a$ are provided by driven rotatable rollers $2^c$ according to this invention.

The upward force Y is again produced by the reaction of the water on the surfaces $2^a$ when the body $1^f$ is propelled under the action of the force X, but the power-speed curve C, Fig. 14, which is obtained with this arrangement is much less steep than the curves A and B and it is thus possible to obtain greatly increased speeds of travel of the body $1^f$, as compared with the bodies, $1^d$ or $1^e$, for the same expenditure of power.

Figure 13:
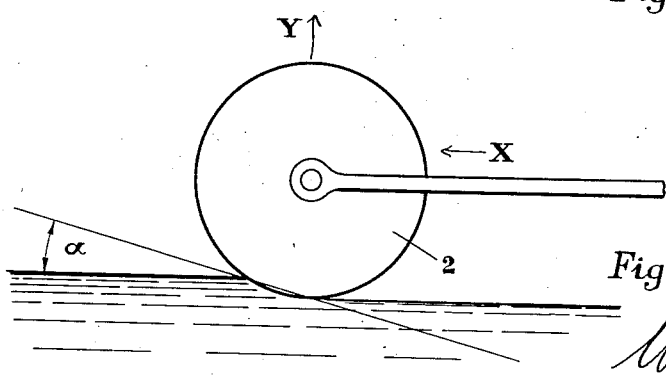
Figure 13 is a diagrammatic view of a roller showing the lifting effect of the water thereon.

Fig. 13 illustrates diagrammatically the manner in which the upward thrust Y is produced when the rollers 2 (or $2^a$) are moved forwardly in the direction of the arrow X.

The angle $\alpha$ between the horizontal and the surface presented to the roller 2 by the wall of water in front thereof varies with the depth of immersion of the roller and as will be understood, the upward thrust Y will be the greater as the angle $\alpha$ increases.

In all the forms of the vessel described with reference to Figs. 1 to 9, it is preferred to provide means for conducting away the water which gains access to the recesses housing the rollers 2, and such means are illustrated by the fragmentary detail views of Figs. 15 to 17.

Each of the recesses 19 is extended rearwardly of the roller 2 therein by an inclined tapering passage 20 which delivers the water entering the recess, due to the rotation of the roller 2 in the direction of the arrow (Fig. 15), laterally of the buoyant body 1 in which the recess is formed, through an outlet 21 in the side of the said body.

Fig. 16 indicates, in addition, an example of gearing 23, 24 for transmitting the rotation of a drive shaft 22, running through a strut 13, to the roller 2.

I claim:—

1. A vessel having a buoyant hull adapted to float on water, the bottom of the hull being formed to provide a plurality of downwardly opening chambers, hollow cylindrical rollers mounted and partly housed, each in one of said chambers and protruding below the bottom of the hull, each roller having a circumferentially smooth periphery, each chamber extending rearward from the roller and opening upon the side of the hull whereby to accommodate the hollow rollers and provide means for conducting water away from the rear of said chambers, means carried by the hull for driving the hull forward, and power operated means for positively operating said rollers in a direction such that they tend to roll forward on the water, the peripheral velocity of the rollers being at least equal to the linear velocity of the hull whereby the reaction of the water on the exposed peripheral portions of the rollers will exert a lifting force on the hull to thus cause the vessel to travel forward with diminished immersion.

2. A vessel having a buoyant hull adapted to float on water, the bottom of the hull being formed to provide a plurality of transversely alined pairs of downwardly opening chambers, hollow cylindrical rollers mounted and partly housed each in one of said chambers and protruding below the bottom of the hull, each roller having a circumferentially smooth periphery and a circumferential flange, means carried by the hull for driving the hull forward, power operated means for positively rotating said rollers in a direction such that they tend to roll forward on the water at a speed at least equal to the linear velocity of the hull, and a pair of elevator fins disposed at the rear of the vessel and a rudder, the elevator fins being independently shiftable to relatively different inclinations whereby to cause the vessel to bank when turning at high speed.

PIETRO CLEMENTE LOMBARDINI.